Sept. 29, 1959     E. C. B. CARLSON     2,906,072
CAN COVER FEED Filed Nov. 16, 1955     7 Sheets-Sheet 1

FIG. 1

INVENTOR.
ELLIOTT C. B. CARLSON
BY
Edward B. Fegg
ATTORNEY

Sept. 29, 1959 E. C. B. CARLSON 2,906,072
CAN COVER FEED
Filed Nov. 16, 1955 7 Sheets-Sheet 2

FIG. 2

INVENTOR
ELLIOTT C.B. CARLSON
BY
ATTORNEY

Sept. 29, 1959 E. C. B. CARLSON 2,906,072
CAN COVER FEED
Filed Nov. 16, 1955 7 Sheets-Sheet 3

FIG. 3

INVENTOR.
ELLIOTT C.B. CARLSON
BY
ATTORNEY

Sept. 29, 1959  E. C. B. CARLSON  2,906,072
CAN COVER FEED

Filed Nov. 16, 1955  7 Sheets-Sheet 4

INVENTOR.
ELLIOTT C. B. CARLSON
BY
ATTORNEY

Sept. 29, 1959  E. C. B. CARLSON  2,906,072
CAN COVER FEED

Filed Nov. 16, 1955  7 Sheets-Sheet 5

FIG. 7

INVENTOR.
ELLIOTT C.B. CARLSON
BY
ATTORNEY

United States Patent Office 2,906,072
Patented Sept. 29, 1959

2,906,072

CAN COVER FEED

Elliott C. B. Carlson, Rockford, Ill., assignor to W. F. & John Barnes Company, Rockford, Ill., a corporation of Illinois Application November 16, 1955, Serial No. 547,151

13 Claims. (Cl. 53—67)

This invention relates to a can cover or can end feed.

Can covers or can ends are supplied to such machines as closing machines, compound liners and compound liner driers by an end feed device which consists essentially of a magazine for supporting a stack of can ends and one or more stripper blades or feed screws located at the bottom of the stack. The feed screw has a knife edge which, as it rotates, penetrates between the lowermost can cover in the stack and the next higher can cover, and strips the lowermost cover from the stack. The stripped can cover is dropped or fed positively into a pocket of a rotary turret. The turret and feed screw are, of course, synchronized.

Can cover feeds of prior design and construction have been relatively slow in their operation, i.e., not more than about 400 to 500 can covers per minute. Higher speeds result in jamming. Another difficulty, even at speeds of 400 to 500 can covers per minute or less, is the fact that the supply of can covers in the magazine becomes exhausted quite rapidly. It will be apparent that, in a can cover feed designed to operate at substantially higher speeds, this difficulty (rapid exhaustion of the supply of can covers) will be aggravated.

It is an object of the present invention to provide an improved feed mechanism adapted to the rapid, automatic feeding of can covers.

It is another object of the invention to provide an improved can cover feed adapted to operate efficiently at higher speeds than can cover feeds employed heretofore.

Yet another object is to provide a can cover feed capable of operating at high speeds without jamming.

A still further object of the invention is to provide a can cover feed capable of operating at high speed and in which means are provided to avoid exhaustion of the supply of can covers at too frequent intervals.

These and other objects of the invention will be apparent from the ensuing description and the appended claims.

One form of the invention is illustrated by way of example in the accompanying drawings in which.

Figure 1:
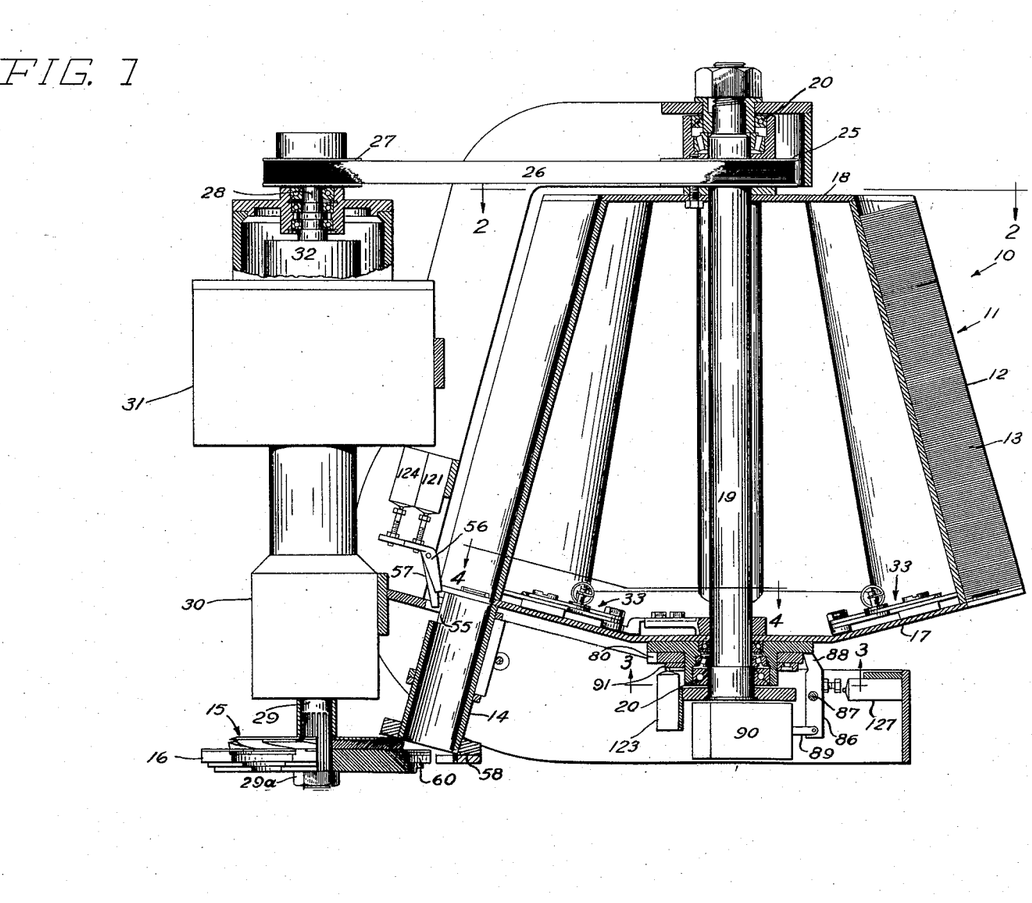
Figure 1 is a view, partly in side elevation and partly in vertical section, of the can cover feed of the invention.
Figure 2:
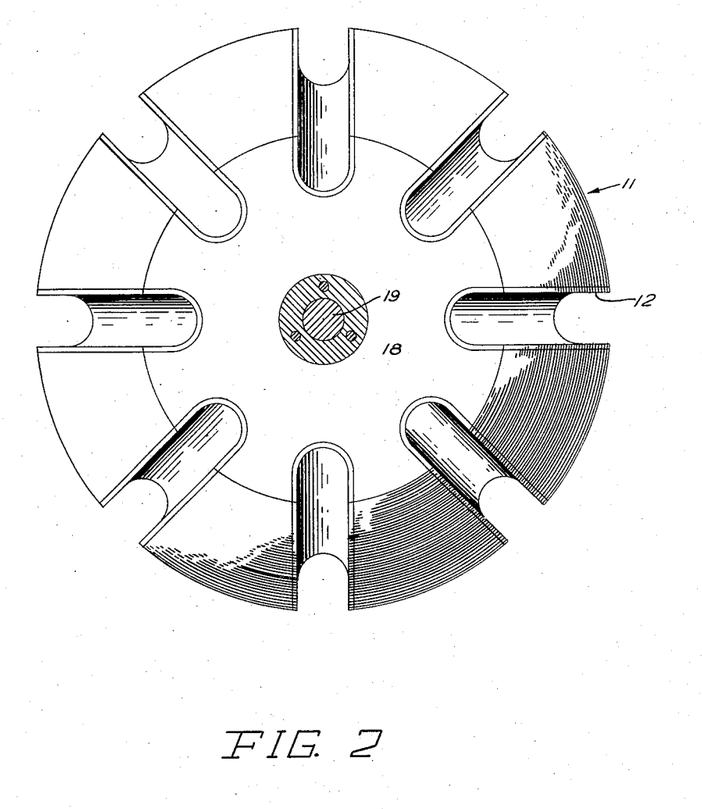
Figure 2 is a section taken along the line 2—2 of Figure 1, showing the can cover turret in top plan view but with the feed chutes empty.

Referring now to the drawings and more particularly to Figure 1, the machine is generally designated by the reference numeral 10 and it comprises a rotary can cover supply turret or magazine 11 of generally conical shape, which includes inclined can cover chutes 12 each of which is intended to hold a stack of can covers, which are shown at 13. A fixed can cover feed tube 14 is also shown, there being only one such tube which occupies a fixed position. The can cover feed chutes 12 are rotated, in turn, into registry with the feed tube 14 in the manner hereinafter described. There is also shown in Figure 1 a can cover feed screw 15 of novel design and construction and also a can cover entrance turret 16 which is intended to receive the can covers as they are stripped from the can cover feed tube 14 and to supply the same to a closing machine (not shown) in timed relation to the supply of can bodies by a can body feed (not shown).

The can cover supply turret 11 comprises a base plate 17, a top plate 18 and a shaft 19, the latter being fixed to the frame of the machine, and about which the turret rotates, suitable bearings being provided at 20. The turret 11 is provided with a driven pulley 25 which is driven by a belt 26 and a driving pulley 27. The pulley 27 is fixed to a vertical shaft 28. As will also be seen from an inspection of Figure 1, a vertical shaft 29 is provided which is in axial alignment with the shaft 28 and which extends through housings 30 and 31. The driving shaft 29 is connected to the driven shaft 28 by an electric clutch 32 of known design and construction which need not be described herein. The housing 30 is intended to contain a transmission for a marker drive which forms no part of the present invention. The housing 31 contains the transmission which drives the shaft 29, such shaft being driven synchronously with a closing machine, or the like, and with a can body feed.

As stated above, a stack of can ends 13 is contained in each of the chutes 12. These chutes are brought successively into registry with the fixed can feed tube 14 in the manner described hereinafter. Until a particular chute 12 is brought into registry with the tube 14, it is necessary to provide bottom support for the stack of can covers 13 in the chute. Such bottom support is illustrated in Figures 4 and 5, and also in Figure 1.

Figure 4:
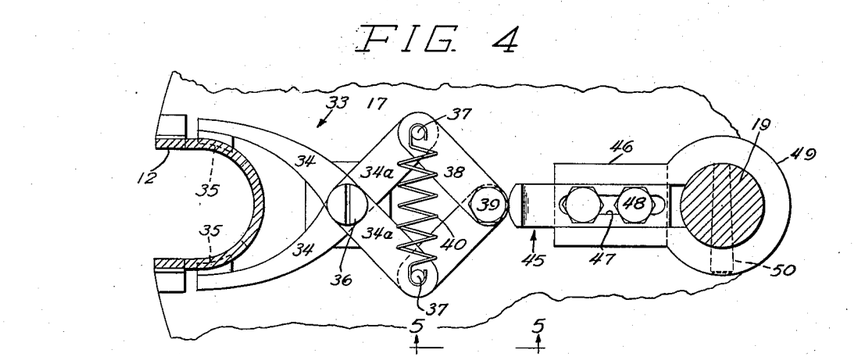
Figure 4 is a view taken along the line 4—4 of Figure 1, showing the cover holder employed to hold the stacks of can covers in the chutes prior to release into the feed tube.
Figure 5:
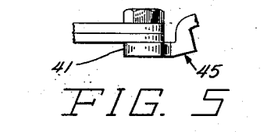
Figure 5 is a fragmentary view in side elevation as seen along the line 5—5 of Figure 4.

Referring to Figures 1, 4 and 5, a can cover holder is there shown which is generally designated by the reference numeral 33. It comprises opposing jaws 34, each having an inwardly projecting lug 35 which, when located beneath its chute 12 athwart the downward path of travel of can covers, will support a stack of can covers. The lugs 35 are shown in Figure 4 in retracted position to allow downward movement of the can covers from the chute 12, the particular chute there shown being in registry with the fixed can cover feed tube 14. The jaws 34 are pivoted at 36 on the base plate 17 and they have rearward extensions 34a which are pivoted at 37 to links 38 which are pivotally connected to one another at 39. A tension spring 40 is provided which is connected at its ends to the pins 37, and it tends to draw the jaws 34 and their lugs 35 toward one another, thereby providing bottom support for a stack of can covers in the chute 12. Normally, the jaws 34 and lugs 35 are in such inward, stack-supporting position, but as each chute 12 is rotated to the position shown in Figure 4, a cam follower 41 contacts a cam 45 which is adjustably mounted on a bracket 46 by means of a slot 47 and screws 48. The bracket 46 is integral with a collar 49 which embraces the shaft 19 and is pinned thereto at 50.

It will, therefore, be apparent that the cover holder 33 of each chute 12 will be held normally in inward, stack-supporting position by the spring 40, but that when such chute and stack are rotated to the position shown at the extreme left of Figure 1, into registry with the fixed can cover feed tube 14, the cam 45 will operate the cover holder 33 to spread the jaws 34 and lugs 35 apart, thereby clearing the lower end of the chute 12 and allowing free, downward movement of can covers from the chute into the tube 14.

Figure 6:
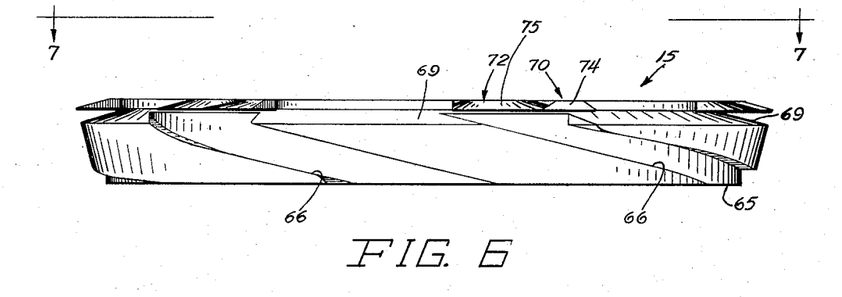
Figure 6 is a view in side elevation of the can cover feed screw.
Figure 7:
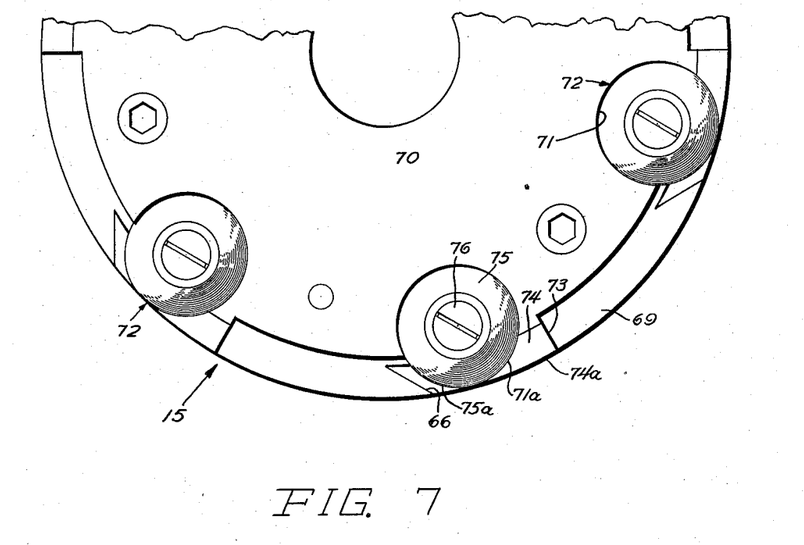
Figure 7 is a fragmentary top plan view of the can cover feed screw.
Figure 9:
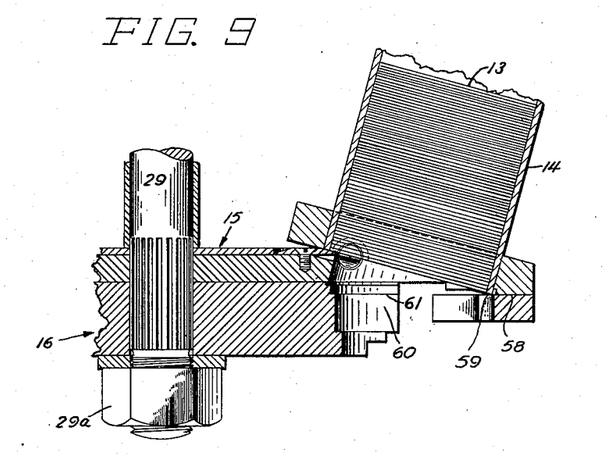
Figure 9 is a view in vertical section showing the location of the can cover feed screw in relation to the can cover feed tube.

Referring now to Figures 1 and 9, the can cover feed tube 14 is cut away at 55 to clear a pair of switch operating levers 56 and 57. As will be seen, the lever 56 has its lower end disposed somewhat above the lower end of the lever 57. More precisely, the lower end of the lever 56 lies athwart the downward, sloping path of travel of can covers at the top of the tube 14. The lower end of the lever 57 also lies athwart the path of travel of can covers, but at a lower level. Referring more particularly to Figure 9, the tube 14 is tilted at an angle of about 17° to the horizontal, with its lower edge in a horizontal plane 58 and its upper edge just above the upper edge of the feed screw 15. Accordingly, the lower edge of the lowermost can cover 13 in the tube 14 rests on a ledge 59 located in the horizontal plane 58, and the upper edge of such can cover rests on the upper edge of the feed screw 15. The entrance turret 16 is formed with radial pockets 60, each of which is formed with a horizontal ledge 61 located in the plane 58. It is the object of the feed screw 15 to separate each lowermost can cover and to screw its upper edge downwardly into a turret pocket 60 and onto its ledge 61, so that it can be rotated to an exit position to be deposited on a can body. The means by which this is accomplished is best shown in Figures 6 and 7, in which the feed screw 15 is shown in detail. Referring to Figures 6 and 7, the feed screw 15 comprises a body 65 of flat, disc-like shape which is formed along its periphery with a plurality of helical threads or grooves 66, there being one thread 66 for each of the entrance turret pockets 60. The feed screw 15 is fixed to the shaft 29 together with the turret 16 by means of a nut 29a (see Figures 1 and 9), and it is located so that the lower end of each of the threads 66 is in precise registry with one of the pockets 60. The upper edge of the body 65 is beveled as shown at 69, the bevel forming an angle of 15°. A cover plate or guard 70 is provided to mask a portion of the open upper end of each of the threads 66. The cover plate 70 is recessed at 60° intervals about its perimeter at 71 to receive stripper blades 72, there being one stripper blade 72 for each thread 66. The diameter of the body of plate 70 is less than the diameter of the body 65 of feed screw 15, such that the beveled edge 69 of the latter is exposed between the blades 72. However, the plate 70 is formed with outwardly projecting tongues 73 which are arcuate at 71a to provide continuations of the circular recesses 71, and which are beveled at their outer edges at 74 and are formed with sharp outer edges 74a.

Each stripper blade 72 is beveled at 75 on a 17° angle and tapers to a knife edge at 75a. It is clamped to the body 65 of the feed screw 15 and by a cap screw 76 and is countersunk such that its upper surface is flush with the upper surface of plate 70. It will, therefore, be apparent that the beveled edges 74 and 75 lie in the same horizontal plane. It will also be apparent that as the feed screw 15 rotates clockwise as viewed in Figure 7 (or to the left as viewed in Figure 9), the lowermost can cover 13 will rest on the segment of beveled surface 69 which is adjacent the stack of can covers in feed tube 14, and that as the screw rotates to a position wherein the corresponding thread 66 is brought into operation, the knifes edge 75a will penetrate between the lowermost can cover and the next higher can cover, thereby separating the lowermost can cover and delivering it to the corresponding thread 66. Continued rotation of the screw 15 will cause the thread 66 to screw the adjacent edge of the separated can cover down to the ledge 61 (see Figure 9). Meanwhile, the next higher can cover will ride on the beveled surfaces 75 and 74 and will then drop to the level of the next beveled segment 69 to be separated by the next stripper blade 72 in like manner.

As one edge of a can cover is separated and screwed down to the ledge 61 of a pocket 60, the opposite edge of the same cover will be already located on the corresponding ledge 59. The can cover thus deposited in a pocket 60 will be carried by the entrance turret 16 to the exit thereof, to be deposited on a can body.

It will be noted that each of the stripper blades 72 is fixed to the body 65 by a cap screw 76. By loosening this cap screw, a blade 72 may be rotated to present a fresh, sharp segment of its knife edge, then clamped in adjusted position by tightening the cap screw.

Figure 3:
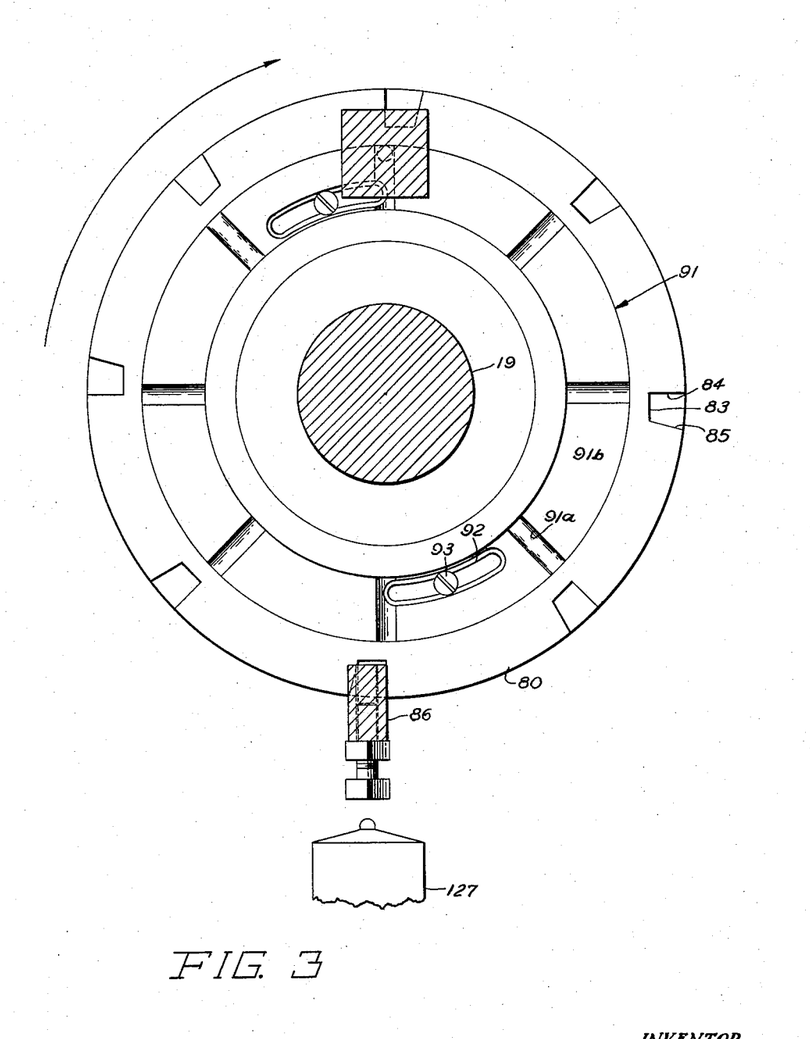
Figure 3 is a view taken along the line 3—3 of Figure 1, showing the indexing plate and one of the cams employed in the operation of the machine.

As mentioned hereinabove, one of the objects of the present invention is to provide an adequate supply of can covers for operation of the machine for a considerable period of time at high speed without the necessity of an operator constantly keeping watch on the machine to replenish the supply of can covers at frequent intervals. To this end, a plurality of chutes 12 are provided, each of which is capable of holding a sizeable stack of can covers. It is, however, necessary to rotate the turret 11 step-by-step, so that when the supply of can covers in one of the chutes 12 (i.e., the chute which is in registry with the feed tube 14), is exhausted, a filled chute will be rotated into position. Apart from the control system and signaling means (which include the switch lever 56), this is accomplished in the following manner: Referring now more particularly to Figures 1 and 3, an indexing plate 80 is provided which is fixed to the bottom of the base plate 17. The indexing plate 80 is provided with a plurality of notches 83, there being one such notch for each of the chutes 12. Each notch 83 has a radial side 84 and a side 85 which lies along a chord of the plate 80. An indexing finger or pawl 86 is provided which is pivoted on the frame of the machine at 87 and which has a nose 88 engageable with the notches 83 of the index plate 80. The pawl 86 is operated by the plunger or armature 89 of a solenoid 90. The solenoid 90, in its normal, de-energized condition, holds the pawl 86 in the position shown in Figure 1, with its nose 88 in one of the notches 83. The slanting side 85 facilitates entry of the pawl.

When the supply of can covers is exhausted from the chute 12 which is in registry with the tube 14, the solenoid 90 is energized and it operates to rotate the pawl 86 in clockwise direction, as viewed in Figure 1, thereby retracting its nose 88 from the corresponding notch 83 in the indexing plate 80. The indexing plate 80, and with it, the can cover turret 11, are then free to rotate. At this time the electric clutch 32 is energized to provide a driving connection between the shafts 28 and 29, thereby providing the motive means to rotate the can cover turret 11. During such rotation, the nose 88 of the pawl 86 rides on the periphery of the indexing plate 80. Meanwhile, as described hereinafter with reference to the control circuit, the solenoid 90 is de-energized, thus allowing the pawl 86 to drop back into the next notch 83, which occurs when the turret 11 has rotated 45° (⅛ of a revolution). Simultaneously, the electric clutch 32 is de-energized, thereby breaking the driving connection between the shaft 29, and the shaft 28 and interrupting the drive for the can cover turret 11. During the short interval of time between exhaustion of one chute and rotating of the next chute into position, an adequate supply of can covers is maintained in the tube 14, so that the supply of can covers to the entrance turrent 16 is uninterrupted.

Also fixed to the indexing plate 80 is a cam 91, best shown in Figure 3, which has a function in connection with the control circuit as explained hereinafter. The cam 91 is adjustably fixed to the base plate 17 by slots 92 and screws 93 and it has low points 91a and high points 91b.

Figure 8:
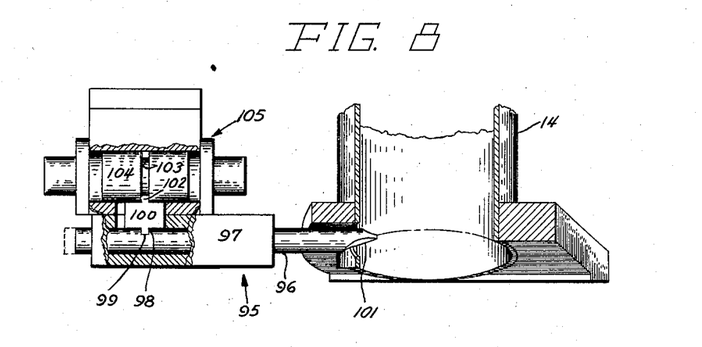
Figure 8 is a view, partly in section and partly in side elevation, of the no can-no cover device employed to interrupt the supply of can covers when there is no corresponding can body being supplied to the closing machine.

Referring now to Figure 8, a no can-no cover device is there shown whose purpose is as follows:

In the operation of a can cover feed in conjunction with a closing machine, it is desired, of course, to supply a can cover for each can body. From time to time, for some reason or another, gaps occur in the can body feed line.

It is common practice to supply can bodies to a closing machine by an indexing screw or the like, such that the can bodies advance in uniformly spaced relation with a definite and predetermined spacing or gap between each can body and the next following can body. Therefore, when a can body is missing, a gap occurs in the line. It is important, wherever a can body is missing, that the corresponding can cover (which would have been supplied to the missing can body), not be delivered to the closing machine, because the pressure of the seaming rolls may distort and bend the can cover, cause a jam and require a shutdown of the closing machine.

Devices known as "no can-no end" or "no can-no cover" devices are provided for this purpose and are well-known in the art. Such devices employ some means or other to prevent further feeding of can ends, or to divert those which have been stripped from the stack, together with a feeler device which spans the normal distance between can bodies and which is kept in one position by the can bodies advancing in normally spaced relation. When a can body is missing the normal gap is widened, the feeler is free to move to another position and, in so doing, it provides a signal which, through an appropriate electrical or other type of circuit, serves to actuate the no can-no cover device to interrupt the supply of can covers to the closing machine.

In connection with a can cover feed of the type herein described, which operates at very high speed, prior no can-no cover devices are not adequate, among other reasons, because they will not respond sufficiently quickly.

There is illustrated in Figure 8 a no can-no cover device, generally designated by the reference numeral 95, which has certain distinct advantages, including high-speed response, rendering it suitable for the high speed can cover feed of the present invention.

Referring now to Figure 8, the device 95 comprises a plunger 96 slideable in a tube 97 which is fixed to the frame of the machine. The plunger 96 is formed with a notch 98 to receive a projection 99 on a slide block 100. The rod or plunger 96 is formed with a tapered, wedge-shaped end at 101. As will be seen, the plunger 96 is disposed beneath the can cover feed tube 14 and it has a normal position, as shown in broken lines, wherein the tip 101 is held clear of the tube 14 and does not interfere with the stripping of can ends. Slide block 100 has another projection 102 which is received within a groove 103 formed in the plunger 104 of a valve 105. The valve 105 may be of any desired type, one suitable type being known as the Bellows Explosion-Proof Valve, No. EVX10A, manufactured by The Bellows Co. of Akron, Ohio. This valve is an electric solenoid-operated pilot valve which has a normal position to hold the rod or plunger 96 in the clear position illustrated in broken lines in Figure 8 and which moves to another position when the solenoid is energized, thereby moving the plunger 96 to the blocking position shown in solid lines.

In operation, and apart from the control system, the valve 105 normally holds the rod or plunger 106 in the clear position indicated in broken lines, but whenever there is a can body missing, the valve 105 is operated to move the rod 96 to the position shown in full lines. In this position it will be seen that the wedge tip 101 of the rod 96 underlies the stack of can covers in the tube 14. The wedge shape of the tip is such that it will lift the upper, tilted edge of the lowermost can cover so as to clear the feed screw 15. It will be understood, of course, that the feeler member which provides the necessary signal to activate the plunger 96 (and which is described hereinafter with reference to Figure 11), will be located at a point in the can body feed line such that the can cover which is blocked corresponds to the missing can body.

Figure 10:
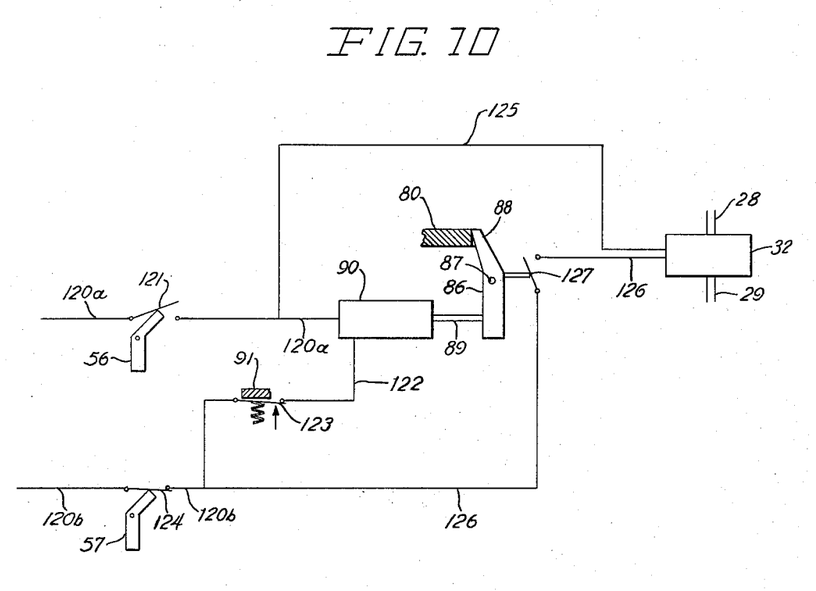
Figure 10 is a diagram of the control circuit of the machine of the invention.

Referring now to Figure 10, a circuit diagram is there shown which includes main power leads 120a and 120b. The lead 120a includes a normally closed switch 121 which, however, is held open by the lever 56 (see Figure 1) as long as a stack of can ends is located in the chute 12 which is in registry with the tube 14. The lead 120a is connected to one terminal of the solenoid 90 (see Figure 1) and the other terminal is connected by a lead 122 containing a normally closed switch 123 to the other power lead 120b. The lead 120b contains a normally open switch 124. The switch 123 is opened by the cam 91 (see Figure 1) and the switch 124 is held closed by the lever 57 (see Figure 1). A lead 125 connects the power lead 120a with one terminal of the electric clutch 32 (see Figure 1) and a lead 126 containing a normally open switch 127 connects the other terminal of the clutch 32 to the other power lead 120b.

The operation, and with reference to the appropriate mechanical figures as well as Figure 10, when the chute 12 in registry with the tube 14 is exhausted, the lever 56 allows switch 121 to close, which energizes solenoid 90 through leads 120a, 122 and 120b. (Switches 123 and 124 are closed.) The solenoid 90 rocks the indexing pawl 86 clockwise, thereby releasing the indexing plate 80 and turret 11, and also closing switch 127. The clutch 32 is, therefore, energized through leads 120a, 125, 126 and 120b. Shaft 28 is, therefore, rotated, and turret 11 commences to rotate. The nose 88 of pawl 86 rides on the periphery of the indexing plate 80. Cam 91 opens switch 123 which de-energizes solenoid 90 so that pawl 86 will return to its normal position when it encounters the next notch 83. In returning to its normal position, the pawl 86 allows switch 127 to open, thereby de-energizing the clutch 32. The pawl drops into the next notch 83 and the motive force rotating the turret ceases operation. The turret is, therefore, located so that the next chute 12 is in registry with the tube 14. The cam 91 will have been rotated to a position to allow the switch 123 to close and the stack of can covers in the new chute will operate lever 56 to open switch 121. During the brief interval of time that the turret is rotating, there is a sufficient supply of can covers in the tube 14 to supply the feed screw 15.

It may happen from time to time that an empty tube 12 is rotated into position; e.g., an operator may have allowed the entire turret 11 to become empty. In that case, the level of the stack of can covers in the tube 14 will drop below the lever 57. The lever 57 will drop and allow the switch 124 to open. This will stop the entire machine, and through an appropriate circuit it may be caused to shut down the closing machine and the can body feed and to actuate a signal, such as a flashing light or a bell or buzzer.

Figure 11:
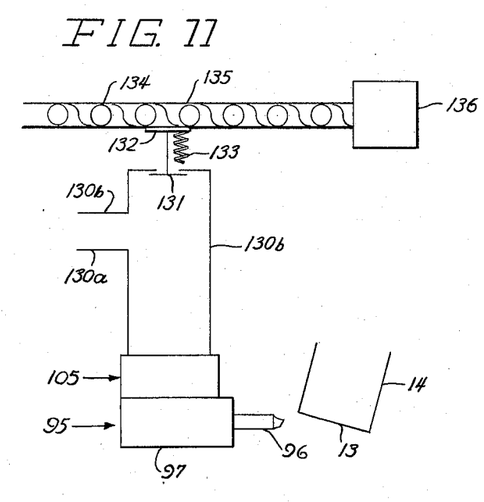
Figure 11 is a diagrammatic view of a no can-no cover device employed with the can cover feed of the invention.

Referring now to Figure 11, the no can-no cover device is there shown diagrammatically. The solenoid of the valve 105 is energized through power leads 130a and 130b. The lead 130b includes a switch 131 which is operated by a feeler member 132. The latter is urged by a spring 133 in such direction as to close the switch 131, hence to energize the solenoid of valve 105. Opposing the spring 133 are can bodies 134 which are indexed by a screw or worm 135 which supplies the can bodies to a closing machine 136 in timed relation to the supply of can covers. The normal spacing of can bodies by the screw 135 is such that a can body is always in contact with the feeler member 132, hence holding the switch 131 open, keeping the solenoid of valve 105 de-energized and keeping the plunger 96 in retracted position. However, when a can body is missing, the spring 133 moves feeler 132 inwardly, closes switch 131, energizes the solenoid of valve 105 and extends the plunger 96 to withhold the can cover corresponding to the missing can body.

It will, therefore, be apparent that a can cover or can end feed has been provided which satisfies the objects enumerated hereinabove. Thus, the machine is capable of operating at a very high speed, of the order of 2,000 to 2,500 can covers per minute. In part, this high speed operation is due to the tilting of the stacks of can ends, which facilitates and speeds up their removal from the stacks. Thus one edge of each can cover, as it reaches the bottom of the stack, is located at the plane 58 which the cover is to be ultimately delivered to the entrance turret 16. Apparently pressure and a lever action tends to cause the lowermost can cover to "pop out," thereby permitting extremely rapid operation of the feed screw 15. The provision of multiple stacks is advantageous for the reason that the capacity of the machine is greatly increased, obviating difficulties arising from rapid exhaustion of the magazine of the machine. Safety features are provided, as will be apparent. Thus, a constant supply of can covers is maintained in the tube 14 so that the supply of can covers to the entrance turret, hence to the closing machine, is uninterrupted during the increments of rotation of the turret 11. Automatic signal means is provided to cause such rotation each time a chute 12 empties. A further important safety feature is the means provided, including the lever 57 and the switch 124, whereby the operation of the entire machine, and operation of associated machines, such as a closing machine and a can body feed, are interrupted, if the supply of can covers in the turret 11 has been exhausted.

The feed screw 15 possesses novel and advantageous features. Thus, it is at all times exactly synchronized with the entrance turret 16, because it is clamped to and is concentric to the entrance turret. The provision of six threads (or any other number desired, corresponding to the number of radial pockets in the entrance turret) permits the feed screw to operate at extremely high speed and to deliver can covers accordingly.

The no can-no cover device illustrated in the drawings and described hereinabove, is advantageous because it provides the necessary safety factor of interrupting the can cover feed whenever there is a missing can body, and in doing so at extremely high speed.

I claim:

1. A feed device of the character described comprising a can cover supply turret rotatable about a vertical, central turret axis and including a plurality of can cover chutes arranged in downwardly and outwardly tilted position and arranged symmetrically about said turret axis, said chutes being open outwardly to permit filling from the side, a similarly tilted can cover tube located beneath said turret in a fixed position to be in registry with each of said chutes as it is rotated into position or registry therewith, a ledge at the lowermost edge of said tube to support the lower edge of the lowermost can cover, a rotary can cover stripper located beneath said tube engageable with the upper edge of said lowermost cover and operable to strip the same from the stack, and automatic indexing means operable, whenever the supply of can covers in said tube reaches a predetermined level, to rotate the turret to bring the next chute into registry with the tube.

2. A feed device of the character described comprising a can cover supply turret rotatable about a vertical, central turret axis and including a plurality of can cover chutes arranged in outwardly and downwardly tilted position and arranged symmetrically about said turret axis, said chutes being open outwardly to permit filling from the side, a similarly tilted can cover tube located beneath said turret in a fixed position to be in registry with each of said chutes as it is rotated into position of registry therewith, a ledge at the lowermost edge of said tube to support the lower edge of the lowermost cover, a rotary can cover stripper located beneath said tube engageable with the upper edge of said lowermost cover and operable to strip the same from the stack, automatic indexing means operable, whenever the supply of can covers in said tube reaches a predetermined level, to rotate the turret to bring the next chute into registry with said tube, and a can cover feed turret having a radial pocket with means to support each detached can cover in the plane of said ledge, said turret being fixed coaxially to said stripper for rotation therewith.

3. An automatic can cover feed machine comprising a rotary stripper rotatable about a first axis to penetrate between the lowermost and next higher can covers in a stack of can covers and thereby force the separated edge of the lowermost can cover downwardly into the pocket of a can cover feed turret; a can cover feed turret coaxial to and beneath said stripper and having a pocket to receive detached can covers said machine also comprising a fixed feed tube arranged in tilted position relatively to said first axis and arranged to deliver the lower edge of a can cover to the level of said feed turret pocket as it delivers the opposite, upper edge to said rotary stripper; a ledge for supporting said lower edge; said machine also comprising a can cover magazine in the form of a turret rotatable about a second axis parallel to said first axis and comprising a plurality of outwardly open can cover chutes tilted at the same angle as said tube and so arranged that each chute, in turn, can be brought into alignment with said tube; and automatic indexing means for rotating said turret in increments to bring a filled chute into alignment with said tube whenever the preceding chute has been emptied.

4. An automatic can cover fed machine comprising a multiple lead rotary stripper rotatable about a first axis to penetrate between the lowermost and next higher can covers in a stack of can covers and thereby force the separated edge of the lowermost can cover downwardly into the pocket of a can cover feed turret; a multiple pocket can cover feed turret having as many pockets as leads on said stripper, said feed turret being fixed coaxially to said stripper for rotation therewith; said machine also comprising a fixed feed tube arranged in tilted position relatively to said first axis and arranged to deliver one edge of a can cover to the level of said feed turret pockets as it delivers the opposite edge to said rotary stripper; said machine also comprising a can cover magazine in the form of a turret rotatable about a second axis parallel to said first axis and comprising a plurality of can cover chutes tilted at the same angle as said tube and so arranged that each chute, in turn, can be brought into alignment with said tube; and automatic indexing means for rotating said turret in increments to bring a filled chute into alignment with said tube whenever the preceding chute has been emptied.

5. An automatic, multiple stack can cover feed comprising a multiple chute turret rotatable about a vertical turret axis, a rotary stripper blade for peeling the lowermost can cover from a stack of can covers, said rotary stripper being located beneath and spaced from the bottom of said turret, a feed tube in registry with said stripper blade to feed can covers thereto and to contain a small supply of can covers sufficient to supply the stripper blade for a short interval of time, said tube being in a fixed position and in registry with each of said chutes in succession as they are rotated, means including a normally disengaged clutch for rotating said turret, indexing means operable automatically to stop rotation of said turret when it has rotated through the angle between two successive chutes, first and second feeler means for gauging the level of the stack of can ends in said tube to provide a first signal when the chute above is empty and a second signal when the tube has been partly emptied, and a control circuit operable to impact a cycle of operation to the machine wherein, when said first signal is given, the clutch is engaged, the turret is rotated, the indexing means then terminates rotation of the turret when the next filled chute is rotated into registry with the tube and the clutch is disengaged; said control circuit also including means operated by said second signal to shut down the machine when the second signal is given.

6. An automatic, multiple stack can cover feed comprising a multiple chute turret rotatable about a vertical turret axis with the chutes tilted outwardly and downwardly, a rotary stripper blade for peeling the lowermost can cover from a stack of can covers, said rotary stripper being located beneath and spaced from the bottom of said turret, a feed tube in registry with said stripper blade to feed can covers thereto and to contain a small supply of can covers sufficient to supply the stripper blade for a short interval of time, said tube being in a fixed position and in registry with each of said chutes in succession as they are rotated, means including a normally disengaged clutch for rotating said turret, indexing means operable automatically to stop rotation of said turret when it has rotated through the angle between two successive chutes, first and second feeler means for gauging the level of the stack of can ends in said tube to provide a first signal when the chute above is empty and a second signal when the tube has been partly emptied, and a control circuit operable to impact a cycle of operation to the machine wherein, when said first signal is given the clutch is engaged, the turret is rotated, the indexing means then terminates rotation of the turret when the next filled chute is rotated into registry with the tube and the clutch is disengaged; said control circuit also including means operated by said second signal to shut down the machine when the second signal is given.

7. An automatic, multiple stack can cover feed comprising a multiple chute turret rotatable about a vertical turret axis with the chutes tilted outwardly and downwardly, a multiple lead rotary stripper blade for peeling the lowermost can cover from a stack of can covers, said rotary stripper being located beneath and spaced from the bottom of said turret, a feed tube in registry with said stripper blade to feed can covers thereto and to contain a small supply of can covers sufficient to supply the stripper blade for a short interval of time, said tube being in a fixed position and in registry with each of said chutes in succession as they are rotated, means including a normally disengaged clutch for rotating said turret, indexing means operable automatically to stop rotation of said turret when it has rotated through the angle between two successive chutes, first and second feeler means for gauging the level of the stack of can ends in said tube to provide a first signal when the chute above is empty and a second signal when the tube has been partly emptied, and a control circuit operable to impart a cycle of operation to the machine wherein, when said first signal is given the clutch is engaged, the turret is rotated, the indexing means then terminates rotation of the turret when the next filled chute is rotated into registry with the tube and the clutch is disengaged; said control circuit also including means operated by said second signal to shut down the machine when the second signal is given.

8. A can end feed device comprising a multiple pocket can cover transfer turret and a multiple lead rotary stripper of the type adapted to strip can covers from the bottom of a stack of such covers, said stripper comprising a cylindrical body having a plurality of spiral grooves formed on its periphery extending from the upper face to the lower face of the body, and a blade for each such groove fixed to one face of the body adjacent its respective groove; said stripper and turret being fixed together coaxially with each spiral groove of the stripper in registry with a turret pocket.

9. A multiple stack can cover feed comprising a rotary stripper located at a fixed position and operable to strip can covers from the bottom of a stack, a tube located above and in registry with said stripper to hold a supply of can covers and to supply the same by gravity to said stripper, a turret magazine comprising a plurality of chutes arranged uniformly about a central vertical axis along a circle overlying the upper end of said tube, indexing means operable automatically, whenever a chute in registry with said tube is emptied, to rotate the turret through the angle between successive chutes, stack supporting means for each chute normally operable to support a stack of covers in such chute, and cam means for operating each said supporting means as its chute is rotated into registry with said tube to release the stack in such chute.

10. In a can cover feed device comprising a stack guide for supporting a stack of can covers and guiding the same to a rotary stripper member, and a rotary stripper member located beneath said guide to strip can covers from the bottom of the stack, the improvement which comprises a no can-no cover device for interrupting the supply of can covers for which the corresponding can bodies of a can body feed are missing, said device comprising an extensible-retractable member which is extensible to a first position underlying said stack and above said stripper and retractable to a second position clear of the path of movement of can covers, and means normally holding said member in its second position but automatically extending it to its first position whenever a can body is missing in a can body feed line corresponding to the lowermost can cover in the stack.

11. A can cover feed device comprising a tilted stack support for supporting a stack of can covers in tilted position, a fixed bottom support for the lower edge of the lowermost cover in the stack, a rotary stripper supporting the upper edge of the lowermost cover and operable to strip such cover from the stack, an extensible-retractable rod located to underlie said stack when in extended position and having a wedge-shaped tip to lift such stack above the stripper, and means for automatically extending and retracting said rod.

12. A can closing assembly comprising a can closing machine, a can cover feed and a can body feed; said can body feed including indexing means to supply can bodies in uniformly spaced relation along a can body feed line to said closing machine; said can cover feed comprising a tilted stack support and guide for supporting a stack of can covers in tilted position for downward movement by gravity, a rotary stripper located beneath said stack for engaging the upper edge of the lowermost cover in the stack and separating the same from the stack, and transfer means for transferring the separated covers to said closing machine; said assembly also including a no can-no cover device comprising a feeler member spanning the normal distance between can bodies in the can body feed line and held in a first position by such can bodies but moving to a second position when not contacted by a can body, an extensible-retractable member extensible to a stack supporting position and retractable to a stack clearing position, and means controlled by said feeler member to hold said extensible-retractable member normally in stack clearing position but to move the same to stack supporting position when said feeler member moves to its second position.

13. A high speed can cover feed comprising a rotatable can cover supply turret having a plurality of outwardly and downwardly inclined chutes each adapted to hold a stack of can covers and to allow the same to drop in the chute by gravity; a connector tube beneath said turret which is similarly inclined and which is located to be in registry with each of said chutes in turn as the turret is rotated, said connector tube having a lower end located in an inclined plane; indexing means adapted to rotate the turret by increments to bring each chute, in turn, into registry with said connectcor tube and to do so whenever the stack of covers in the registering chute has been emptied; a multiple lead rotary stripper having a lower face and having an upper face adjacent the upper edge of the lower end of said connector tube, said upper face being provided with a plurality of stripper blades each adapted to penetrate between the lowermost and next higher cover of a stack of can covers to separate the lowermost cover, there being one lead on the periphery of the stripper for and in registry with each stripper blade, each such lead being adapted to screw a separated cover down to the level of the next lower face of the stripper; and a can cover transfer member fixed to the lower face of and coaxial to said stripper and having a pocket for and in registry with each lead on the stripper to receive and transfer separated can covers.

References Cited in the file of this patent

UNITED STATES PATENTS

| | | |
|---|---|---|
| 1,964,078 | Podel | June 26, 1934 |
| 2,325,165 | Goodwin | July 27, 1943 |
| 2,353,200 | Sundell | July 11, 1944 |
| 2,374,168 | Bowman | Apr. 24, 1945 |
| 2,385,267 | Franz | Sept. 18, 1945 |
| 2,497,718 | Earley et al. | Feb. 14, 1950 |
| 2,666,563 | Stover | Jan. 19, 1954 |
| 2,734,674 | Ray | Feb. 14, 1956 |

FOREIGN PATENTS

| | | |
|---|---|---|
| 639,623 | Great Britain | July 5, 1950 |